US006314359B1

(12) United States Patent
Janic et al.

(10) Patent No.: US 6,314,359 B1
(45) Date of Patent: Nov. 6, 2001

(54) SYSTEM FOR MODIFYING A LOAD BIAS FUNCTION BASED ON TRANSIENT ENGINE OPERATION

(75) Inventors: Dusan M. Janic; Michael J. McGuire, both of Columbus; Howard E. Moore, Seymour, all of IN (US)

(73) Assignee: Cummins Engine Company, Inc., Columbus, IN (US)

( * ) Notice: Subject to any disclaimer, the term of this patent is extended or adjusted under 35 U.S.C. 154(b) by 0 days.

(21) Appl. No.: 09/583,051

(22) Filed: May 30, 2000

(51) Int. Cl.[7] ............................ F02D 41/10; F02D 41/12; G01M 15/00

(52) U.S. Cl. .......................... 701/110; 123/480; 123/492; 73/117.3

(58) Field of Search .................................... 701/103, 104, 701/105, 110, 111, 115; 123/478, 480, 486, 488, 492, 493; 73/116, 117.3

(56) References Cited

U.S. PATENT DOCUMENTS

| | | | |
|---|---|---|---|
| 4,951,635 | 8/1990 | Nakaniwa et al. | 123/492 |
| 5,070,846 | 12/1991 | Dudek et al. | 123/488 |
| 5,233,530 | 8/1993 | Shimada et al. | 701/107 |
| 5,268,842 | 12/1993 | Marston et al. | 701/105 |
| 5,469,826 | 11/1995 | Thomas et al. | 123/488 |
| 5,515,720 | 5/1996 | Remboski, Jr. et al. | 73/116 |
| 5,517,410 | 5/1996 | Nakagawa et al. | 701/51 |
| 5,522,367 * | 6/1996 | Reuschenbach et al. | 123/492 |
| 5,532,929 | 7/1996 | Hattori et al. | 701/110 |
| 5,615,654 | 4/1997 | Weisman, II et al. | 123/350 |
| 5,806,014 | 9/1998 | Remboski et al. | 701/111 |
| 5,864,770 | 1/1999 | Ziph et al. | 701/110 |
| 5,889,203 * | 3/1999 | Wild et al. | 73/117.3 |
| 5,983,867 * | 11/1999 | Stuber et al. | 123/488 |

* cited by examiner

*Primary Examiner*—Willis R. Wolfe
(74) *Attorney, Agent, or Firm*—Barnes & Thornburg

(57) ABSTRACT

The present invention relates to a system for controlling loading of an internal combustion engine based on a an adjusted load bias signal produced by an engine control computer. The engine control computer is responsive to engine speed and commanded fueling to produce a load bias signal, is responsive to engine speed, engine intake air pressure and the load bias signal to produce an acceleration-adjusted load bias value, and is responsive to engine speed, a reference engine speed and the load 10 bias signal to produce a deceleration-adjusted load bias value. The engine control computer is thereafter operable to compare the load bias value, the acceleration-adjusted load bias value and the deceleration-adjusted load bias value and produce the adjusted load bias signal as one of these three signals based on a comparison therebetween. The adjusted load bias signal is provided to an external load generator operable to control loading of the engine based thereon. Improper loading of the engine is avoided with the present invention by accounting for transient engine operation involving engine acceleration and deceleration conditions.

43 Claims, 5 Drawing Sheets

SYSTEM FOR MODIFYING A LOAD BIAS FUNCTION BASED ON TRANSIENT ENGINE OPERATION

FIELD OF THE INVENTION

The present invention generally relates to systems for controlling engine operation toward an optimum operating point, and more particularly to such systems operable to modify such control during vehicle acceleration and deceleration conditions.

BACKGROUND OF THE INVENTION

It is known in the control of internal combustion engines, particularly in industrial applications, to control engine load via an external generator. Such generators are typically electronically controlled and are responsive to at least a so-called "load bias" signal produced by electronic engine control circuitry to apply a corresponding load to the engine.

An example of a portion of a prior art control circuit 3 producing a steady state load bias signal (LB) is shown in FIG. 1. Control circuit 3 includes a load bias calculation block 5 receiving a commanded fueling (CF) signal and an engine speed (ES) signal, wherein block 5 is operable to produce the load bias signal LB as a function thereof. Conventionally, the load bias signal is determined by comparing ES with CF and producing LB as a signal proportional to where the current engine operation point is (typically in relation to an engine output power or torque curve or map) relative to an optimal operating point. The optimal rating point is typically determined as the most efficient engine power generated at a given engine speed.

While the prior art load bias signal LB provides for accurate and effective engine load control during steady state operating conditions, this accuracy and efficacy diminishes during transient operating conditions. For example, during engine acceleration conditions, if the load bias signal LB is directly followed it results in less than optimal or sluggish engine performance. Optimal engine acceleration is dependent on the amount of air (boost pressure) and fuel available to the engine at any given engine speed.

Likewise, during deceleration of the engine, if the load bias curve is directly followed it results in less than optimal engine performance. The load bias signal in this case will request more load as the engine is decelerating, as the requested fueling is very low during deceleration conditions (i.e. the operator lets up on the throttle). The engine accordingly decelerates at the same time that the load bias signal is requesting more loading, which results in excessive loading on the engine when the target engine RPM is reached. This typically results in the target RPM being overshot, which is an undesirable engine response.

What is therefore needed is a system for improving the load bias signal LB to provide optimal engine performance not only during steady state engine operating conditions, but also during transient engine operating conditions such as during engine acceleration and deceleration.

SUMMARY OF THE INVENTION

The foregoing shortcomings of the prior art are addressed by the present invention. In accordance with one aspect of the present invention, a system for producing an adjusted load bias signal to provide for optimal acceleration conditions for an internal combustion engine comprises means for sensing engine rotational speed and producing an engine speed signal corresponding thereto, means for sensing intake air pressure of an internal combustion engine and producing a boost pressure signal corresponding thereto, means for determining a load bias signal as a function of the engine speed signal, and means for producing an adjusted load bias signal as one of the load bias signal and an acceleration-adjusted load bias signal, wherein the acceleration-adjusted load bias signal is based on the boost pressure signal and the engine speed signal.

In accordance with another aspect of the present invention, a method of producing an adjusted load bias signal to provide for optimal acceleration conditions for an internal combustion engine comprises the steps of sensing engine rotational speed, sensing engine intake air pressure, determining a load bias signal as a function of the engine rotational speed, determining an acceleration-adjusted load bias signal based on the engine rotational speed and the engine intake air pressure, and producing an adjusted load bias signal as one of the load bias signal and the acceleration-adjusted load bias signal.

In accordance with a further aspect of the present invention, a system for producing an adjusted load bias signal to provide for optimal deceleration conditions for an internal combustion engine comprises means for sensing engine rotational speed and producing an engine speed signal corresponding thereto, means for determining a reference engine speed, means for determining a load bias signal as a function of the engine speed signal, and means for producing an adjusted load bias signal as one of the load bias signal and a deceleration-adjusted load bias signal, wherein the deceleration-adjusted load bias signal is based on the engine speed signal and the reference engine speed.

In accordance with yet another aspect of the present invention, a method of producing an adjusted load bias signal to provide for optimal deceleration conditions for an internal combustion engine comprising the steps of sensing engine rotational speed, determining a reference engine speed, determining a load bias signal as a function of the engine rotational speed, determining a deceleration-adjusted load bias signal based on the engine rotational speed and the reference engine speed, and producing an adjusted load bias signal as one of the load bias signal and the deceleration-adjusted load bias signal.

In accordance with still another aspect of the present invention, a system for producing an adjusted load bias signal to provide for optimal acceleration and deceleration conditions for an internal combustion engine comprises means for sensing engine rotational speed and producing an engine speed signal corresponding thereto, means for sensing intake air pressure of an internal combustion engine and producing a boost pressure signal corresponding thereto, means for determining a reference engine speed, and a control computer computing a load bias signal as a function of said engine speed signal, the control computer computing an acceleration-adjusted load bias value as a function of the engine speed and boost pressure signals and computing a deceleration-adjusted load bias value as a function of the engine speed signal and the reference engine speed, the control computer producing an adjusted load bias signal as one of the load bias signal, the acceleration-adjusted load bias value and the deceleration-adjusted load bias value.

In accordance with still a further aspect of the present invention, a method of producing an adjusted load bias signal to provide for optimal acceleration and deceleration conditions for an internal combustion engine comprising the steps of sensing engine rotational speed of an internal combustion engine, sensing engine intake air pressure, determining a reference engine speed based on operator requested torque, determining a load bias signal as a function of the engine rotational speed, determining an acceleration-adjusted load bias signal based on the engine rotational speed and the engine intake air pressure, determining a deceleration-adjusted load bias signal based on the engine rotational speed and the reference engine speed, and producing an adjusted load bias signal as one of the load bias signal, the acceleration-adjusted load bias signal and the deceleration-adjusted load bias signal.

One object of the present invention is to optimize the performance of the engine and improve responsiveness and driveability of the vehicle in which the engine is placed.

Another object of the present invention is to provide such optimization by modifying the load bias signal for optimum engine performance during engine acceleration conditions.

Yet another object of the present invention is to provide such optimization by modifying the load bias signal for optimum engine performance during engine deceleration conditions.

These and other objects of the present invention will become more apparent from the following description of the preferred embodiments.

DESCRIPTION OF THE PREFERRED EMBODIMENTS

Figure 1:
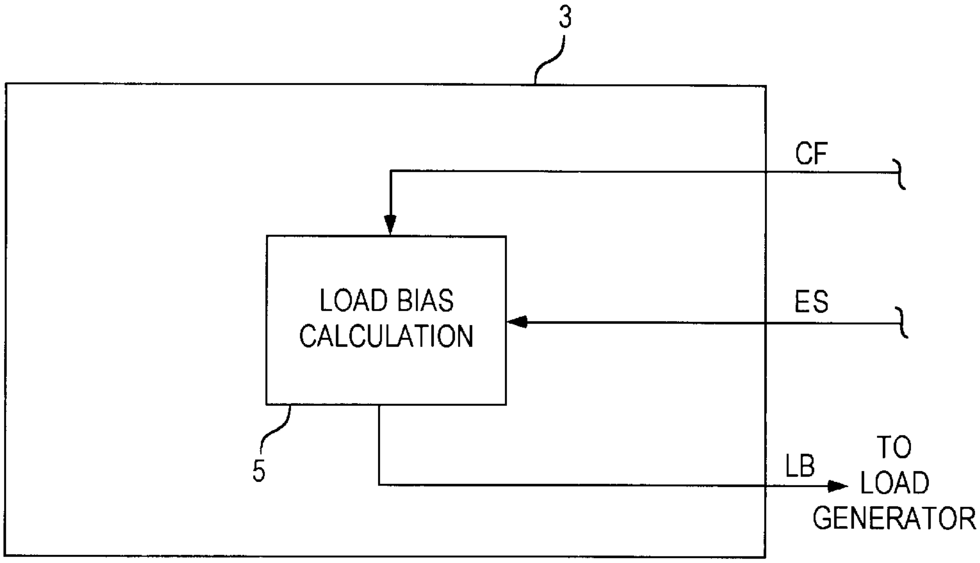
FIG. 1 (Prior Art)
FIG. 1 is a block diagram of a prior art engine control system producing a load bias signal.

For the purposes of promoting an understanding of the principles of the invention, reference will now be made to a number of preferred embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

Figure 2:
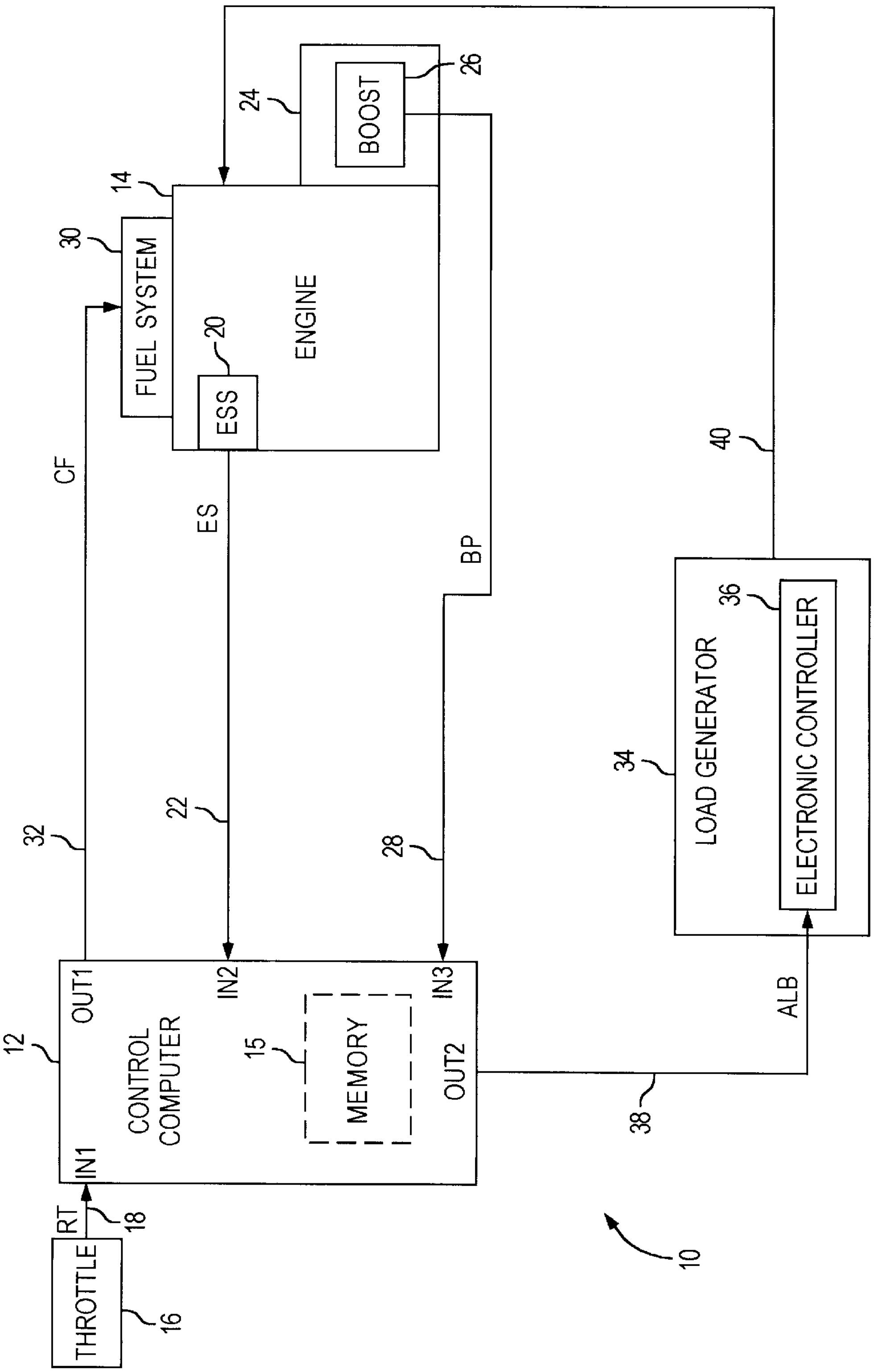
FIG. 2 is a block diagram of an engine control system producing an improved load bias signal in accordance with the present invention.

Referring to FIG. 2, one preferred embodiment of an engine control system 10, in accordance with the present, is shown. System 10 includes as its central component a control computer 12 having a memory 15 and operable to control and manage the overall operation of an internal combustion engine 14. In one embodiment, control computer is a known engine control computer that is sometimes referred to in the industry as an electronic control module (ECM), electronic control unit (ECU), or the like.

System 10 includes a number of sensors and/or actuators, wherein control computer 12 is responsive to signals supplied by such sensors and/or actuators to control the operation of engine 14 as is known in the art. For example, system 10 includes a throttle 16 electrically connected to an input IN1 of control computer 12 via signal path 18 and producing a requested torque (RT) signal thereon. Throttle 16 may be any known mechanism for producing a requested torque signal RT corresponding to driver requested fueling, and in one embodiment, throttle 16 is an accelerator pedal of known construction. Alternatively, throttle 16 may be a known cruise control system, hand actuated throttle mechanism, or the like.

Engine 14 includes an engine speed sensor (ESS) 20 electrically connected to an input IN2 of control computer 12 via signal path 22 and producing an engine speed signal (ES) thereon corresponding to engine rotational speed. In one embodiment, the engine speed sensor 20 is a known Hall effect sensor operable to produce an engine speed and position signal, although the present invention contemplates using other known sensors or sensing systems for providing the engine speed signal ES such as a variable reluctance sensor, or the like. Engine 14 also includes a turbocharger 24 and a boost pressure sensor 26 electrically connected to an input IN3 of control computer 12 via signal path 28. Boost pressure sensor 26 is preferably located within an air intake port or manifold (not shown) of the engine 14 and is operable to sense a pressure of intake air entering engine 14, as is known in the art, and produce a boost pressure signal (BP) corresponding thereto.

Control computer 12 includes an output OUT1 electrically connected to a fuel system 30 of engine 14 via signal path 32. In accordance with known techniques, computer 12 is operable to determine fueling requirements for engine 14, typically based on a number of engine operating parameters, and produce a corresponding commanded fueling (CF) signal on signal path 32. Fuel system 20 is, in turn, responsive to the commanded fueling signal CF to supply fuel to engine 14 as is known in the art.

Control computer 12 also includes an output OUT2 electrically connected to an electronic controller 36 of a known load generator 34 via signal path 38. In accordance with the present invention, control computer 12 is operable to produce an adjusted load bias signal (ALB) on signal path 38 corresponding to the load bias signal (LB) described with respect to FIG. 1 modified to account for engine acceleration and deceleration conditions. The electronic controller 36 is responsive to the adjusted load bias signal ALB to control the load generator 34, as is known in the art, to effectuate load control of engine 14 via process path 40.

Figure 3:
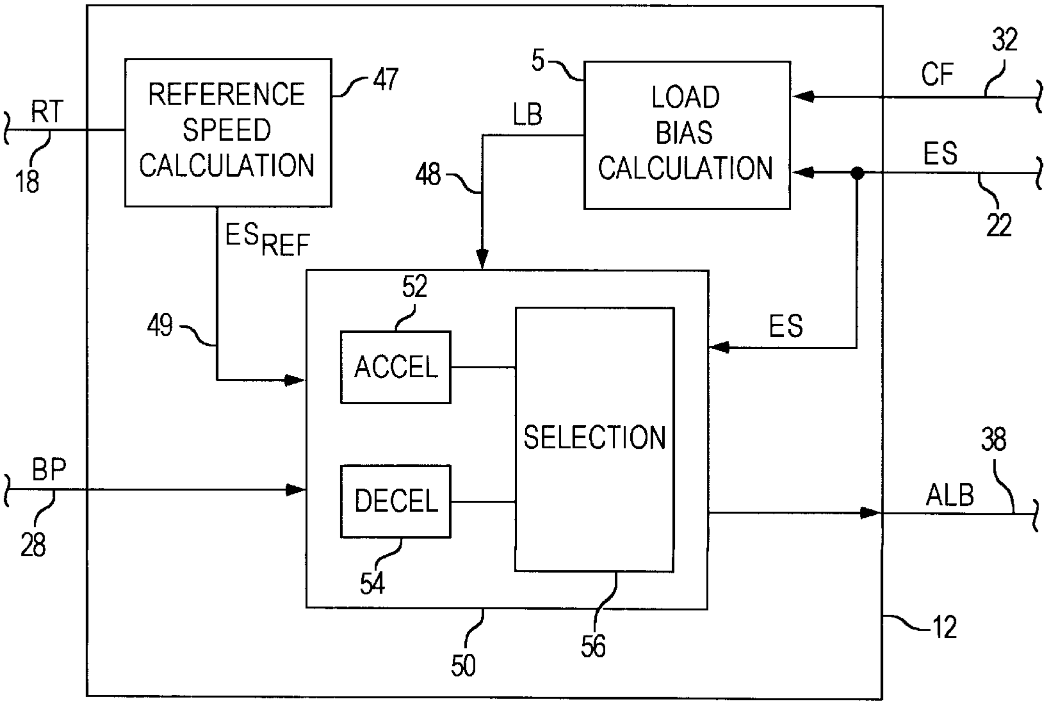
FIG. 3 is a block diagram of one preferred embodiment of at least a portion of the control computer 12 of FIG. 2 illustrating some of the concepts of the present invention..

Referring now to FIG. 3, one preferred embodiment of at some of the internal features of control computer 12, as they relate to the present invention, are shown. It is to be understood that while the features illustrated in FIG. 3 are shown as blocks, such blocks are not necessarily intended to represent physical structure but rather functional blocks that are typically executed via software. In any case, computer 12 includes a load bias calculation block 5, which is preferably identical in structure and function to the load bias calculation block 5 of FIG. 1, wherein block 5 is responsive to the commanded fueling (CF) and engine speed (ES) signals on signal paths 32 and 22 respectively, to produce a load bias signal LB value on path 48. For example, load bias calculation block 5 preferably uses the engine speed signal ES on signal path 22 and the commanded fueling signal CF on signal path 32, in a known manner, to determine a current engine operating point relative to an optimal operating point (most efficient engine power generated at a given engine speed). Block 5 is then operable to produce the load bias value LB on path 48 that is proportional to the current operating point relative to the optimal operating point. Alternatively, block 5 may be responsive to CF and ES, and/or any other engine operating parameter signals, to produce LB in accordance with any other known technique therefore.

In any case, computer 12 further includes a reference speed calculation block 47 responsive to the requested torque signal RT to compute a reference engine speed $ES_{REF}$ in accordance with known techniques therefore, and to provide the $ES_{REF}$ value on path 49. Computer 12 further includes a load bias adjustment or modification block 50 receiving the reference engine speed value $ES_{REF}$ on path 49, the load bias value LB on path 48, the engine speed signal ES on signal path 22, and the boost pressure signal on signal path 28, and producing an adjusted load bias signal (ALB) on signal path 38. As shown in FIG. 3, load bias adjustment block 50 preferably includes an engine acceleration adjustment block 52 and an engine deceleration adjustment block 54 coupled to a selection block 56, wherein block 50 is operable to compute respective engine acceleration adjusted load bias and engine deceleration adjusted load bias values, and selectively produce an appropriate load bias value on signal path 38.

Figure 4:
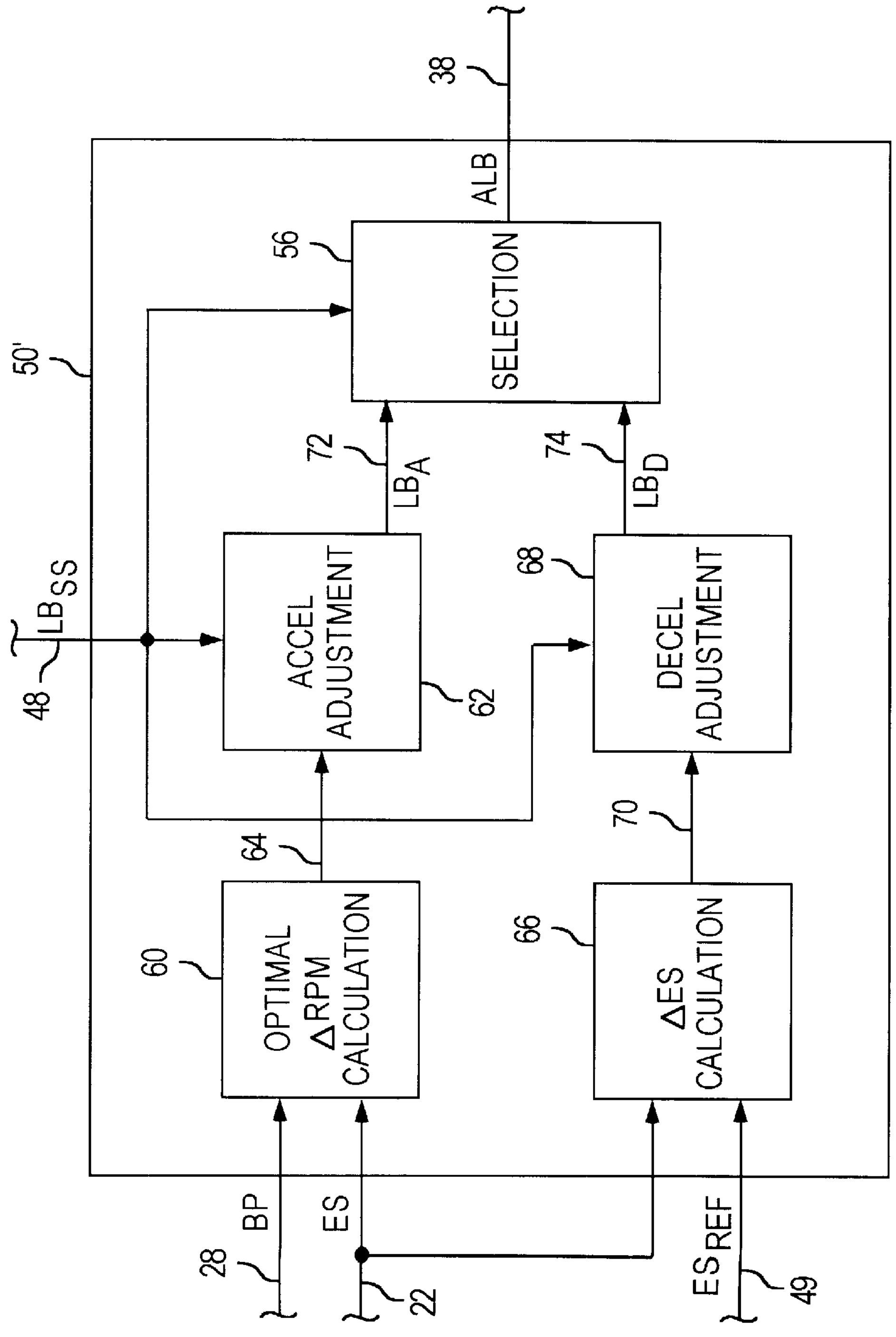
FIG. 4 is a block diagram illustrating one preferred embodiment of the load bias signal modification block of FIG. 3.

Referring now to FIG. 4, one preferred embodiment 50' of the load bias adjustment or modification block 50 of FIG. 3, in accordance with the present invention, is shown. Block 50' includes an optimal ΔRPM calculation block 60 receiving as inputs the boost pressure BP and engine speed ES signals on signal paths 28 and 22 respectively, and producing on path 64 an optimal ΔRPM value. Block 60 may be implemented as a look-up table, graph or one or more equations relating current engine speed and boost pressure to an optimum rate of change of engine RPM for such operating conditions, wherein block 60 supplies the optimum rate of change of RPM (ΔRPM) value to an acceleration adjustment block 62 via path 64. Acceleration adjustment block 62 is operable to receive the load bias signal LB on path 48 and the optimum ΔRPM value on path 64 and produce an acceleration-adjusted load bias value $LB_A$ on path 72 as a function thereof. Block 62 may be implemented as a look-up table, graph or one or more equations relating LB and the optimal ΔRPM value to an appropriate $LB_A$ value.

Block 50' further includes a ΔES calculation block 66 receiving as inputs the reference engine speed value $ES_{REF}$ and engine speed ES signal on signal paths 49 and 22 respectively, and producing on path 70 a ΔES value. Block 66 is preferably implemented as a comparison or subtraction function operable to compute ΔES as a difference between $ES_{REF}$ and ES. A Deceleration adjustment block 68 is operable to receive the load bias signal LB on path 48 and the ΔES value on path 70 and produce a deceleration-adjusted load bias value $LB_D$ on path 74 as a function thereof. Block 68 may be implemented as a look-up table, graph or one or more equations relating LB and the ΔES value to an appropriate $LB_D$ value.

Block 50' further includes a load bias selection block 56 receiving the load bias value LB, the acceleration-adjusted load bias value $LB_A$, and the deceleration-adjusted load bias value $LB_D$ from paths 48, 72 and 74 respectively, and producing an adjusted load bias signal ALB on signal path 38 as a function thereof. In one preferred embodiment, block 56 is operable to compare the two adjusted load bias values $LB_A$ and $LB_D$ with the load bias signal LB, and select an appropriate one of the three to supply on signal path 38 as the adjusted load bias signal ALB based on this comparison. In this embodiment, block 56 is operable to produce the acceleration-adjusted load bias value $LB_A$ as the adjusted load bias signal ALB if the acceleration-adjusted load bias value $LB_A$ is significantly different than the other two load bias values $LB_D$ and LB. Conversely, if the deceleration-adjusted load bias value $LB_D$ is significantly different than the other two load bias values $LB_A$ and LB, block 56 is operable to produce the 25 deceleration-adjusted load bias value $LB_D$ as the adjusted load bias signal ALB. Finally, if all three load bias values LB, $LB_A$ and $LB_D$ are nearly the same, then block 56 is operable to produce the original load bias signal LB as the adjusted load bias signal ALB.

Figure 5:
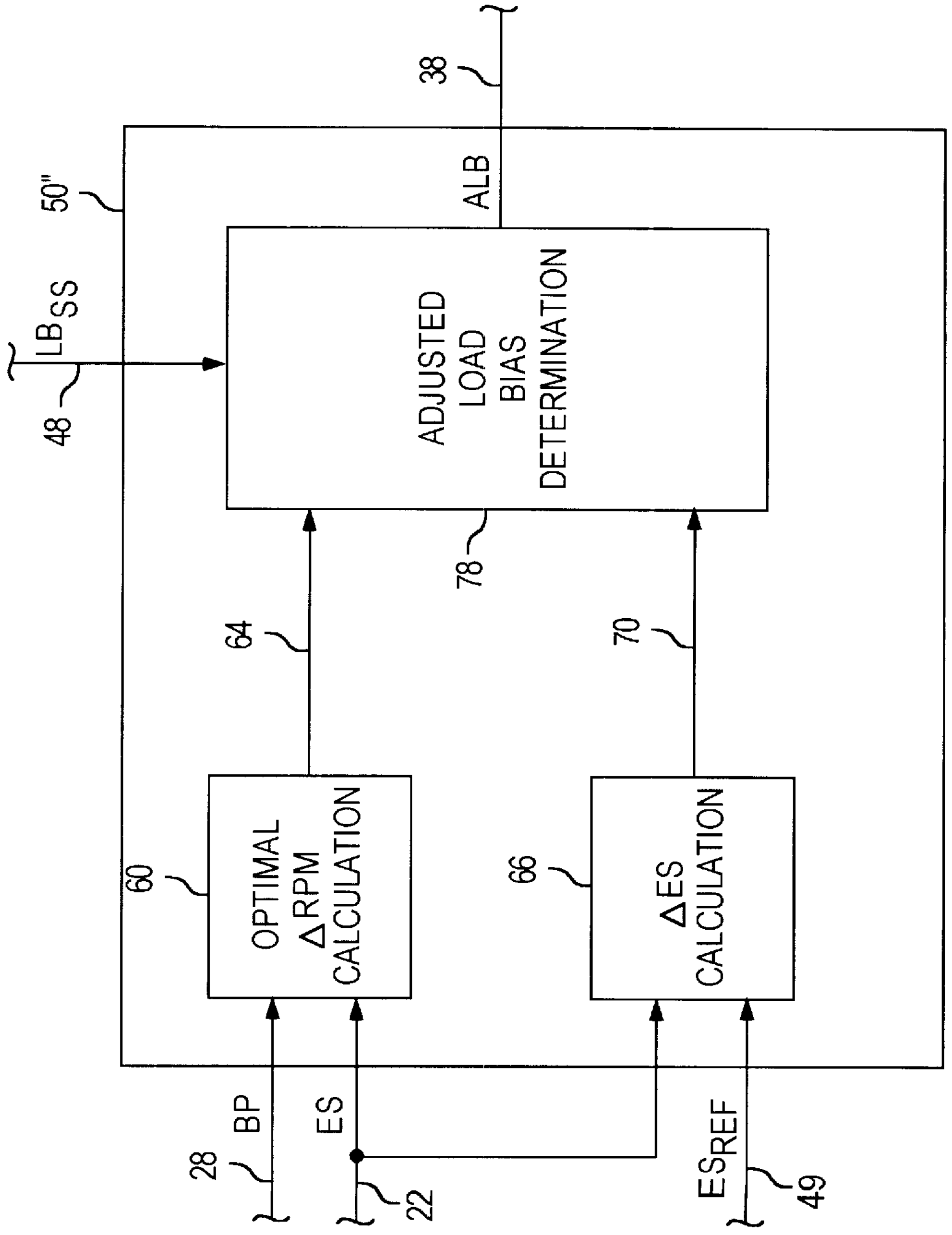
FIG. 5 is a block diagram illustrating an alternative embodiment of the load bias signal modification block of FIG. 3.

Referring now to FIG. 5, an alternate embodiment 50" of the load bias adjustment or modification block 50 of FIG. 3, in accordance with the present invention, is shown. Block 50" is similar in many respects to block 50' of FIG. 4, and like reference numbers are therefore used to identify like components. Block 50" differs from block 50' in that the optimal ΔRPM value produced on path 64 by block 60 and the ΔES value produced on path 70 by block 66 are fed directly into an adjusted load bias determination block 78. Block 78 is responsive to the load bias signal LB and the optimal ΔRPM and ΔES values to determine, and produce on signal path 38, an appropriate adjusted load bias signal ALB. In this embodiment, block 78 may be implemented as a look-up table, graph, one or more equations, or algorithm operable to directly determine an appropriate adjusted load bias signal ALB, as described above, based on the load bias signal LB and the optimal ΔRPM and ΔES values.

Figure 6:
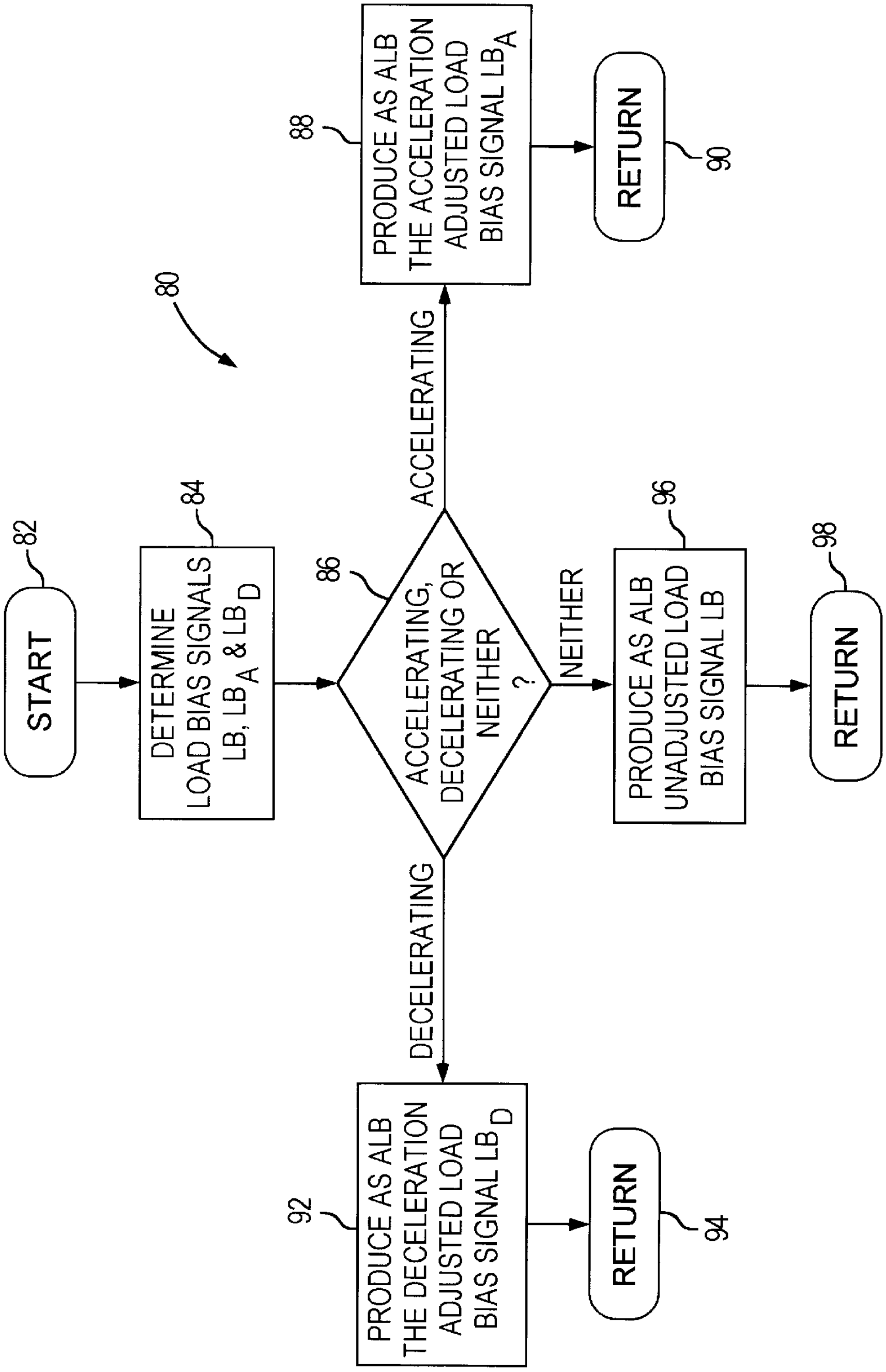
FIG. 6 is a flowchart illustrating one preferred embodiment of a software algorithm for executing the adjusted load bias signal feature illustrated in FIG. 3.

Referring now to FIG. 6, one preferred embodiment of a software algorithm 80 for executing the adjusted load bias signal feature illustrated in FIG. 3 is shown. Algorithm 80 is preferably stored within memory 15 and is executable by control computer 12 to effectuate the process illustrated therein. Algorithm 80 begins at step 82 and at step 84, control computer 12 is operable to compute load bias signal LB, the acceleration-adjusted load bias value $LB_A$ and the deceleration-adjusted load bias value $LB_D$, all as described hereinabove. Thereafter at step 86, control computer 12 is operable to determine, preferably based on a comparison between LB, $LB_A$ and $LB_D$, whether the engine 14 is accelerating, decelerating or neither. If control computer 12 determines that the engine 14 is accelerating, algorithm execution advances to step 88 where control computer 12 is operable to produce as the adjusted load bias signal ALB the acceleration-adjusted load bias value $LB_A$. Algorithm 80 returns thereafter to its calling routine at step 90. If, on the other hand, control computer 12 determines at step 86 that the engine 14 is decelerating, algorithm execution advances to step 92 where control computer 12 is operable to produce as the adjusted load bias signal ALB the deceleration-adjusted load bias value $LB_D$. Algorithm 80 returns thereafter to its calling routine at step 94. Finally, if control computer 12 determines at step 86 that the engine 14 is neither accelerating nor decelerating, algorithm execution advances to step 96 where control computer 12 is operable to produce as the adjusted load bias signal ALB the original (unadjusted) load bias signal LB. Algorithm 80 returns thereafter to its calling routine at step 98.

In operation the electronic controller 36 (FIG. 1) will receive an unadjusted load bias signal LB, an acceleration-adjusted load bias signal $LB_A$, or a deceleration-adjusted load bias signal $LB_D$ depending on whether the engine is running at a steady rate, accelerating, or decelerating condition, respectively. The unadjusted load bias signal LB generally corresponds to the lowest fuel consumption point for a given engine speed and is preferably calculated in a conventional manner from an engine speed signal and a fueling command signal. The acceleration-adjusted load bias signal $LB_A$ is determined using the engine speed signal, a boost pressure signal, and the unadjusted load bias signal LB. The deceleration-adjusted load bias signal $LB_D$ is determined using the engine speed signal, a reference engine speed value, and the unadjusted load bias signal LB.

While the invention has been illustrated and described in detail in the foregoing drawings and description thereof, the same is to be considered as illustrative and not restrictive in character, it being understood that only preferred embodiments thereof have been shown and described and that all changes and modifications that come within the spirit of the invention are desired to be protected.

What is claimed is:

1. A system for producing an adjusted load bias signal to provide for optimal acceleration conditions for an internal combustion engine, comprising:

means for sensing engine rotational speed and producing an engine speed signal corresponding thereto;

means for sensing intake air pressure of an internal combustion engine and producing a boost pressure signal corresponding thereto;

means for determining a load bias signal as a function of said engine speed signal; and means for producing an adjusted load bias signal as one of said load bias signal and an acceleration-adjusted load bias signal, said acceleration-adjusted load bias signal based on said boost pressure signal and said engine speed signal.

2. The system of claim 1 further including means responsive to said adjusted load bias signal for controlling loading of said engine.

3. The system of claim 1 further including a fuel system responsive to a fueling command to supply fuel to said engine;

and wherein said means for determining said load bias value is further operable to determine said load bias value as a function of said fueling command.

4. The system of claim 1 further including a turbocharger operable to supply supplemental intake air flow to an air intake port of said engine.

5. The system of claim 1 wherein said means for producing an adjusted load bias signal includes:

means for determining an optimal rate of change of engine RPM as a function of said engine speed signal and of said boost pressure signal; and means for producing said acceleration-adjusted load bias signal as a function of said optimal rate of change of engine RPM and of said load bias signal.

6. The system of claim 4 wherein said means for producing an adjusted load bias signal includes means for producing said adjusted load bias signal as one of said load bias signal and said acceleration-adjusted load bias signal based on a comparison therebetween.

7. A method of producing an adjusted load bias signal to provide or optimal acceleration conditions for an internal combustion engine, the method comprising the steps of:

sensing engine rotational speed;

sensing engine intake air pressure;

determining a load bias signal as a function of said engine rotational speed;

determining an acceleration-adjusted load bias signal based on said engine rotational speed and said engine intake air pressure; and producing an adjusted load bias signal as one of said load bias signal and said acceleration-adjusted load bias signal.

8. The method of claim 7 further including the step of controlling loading of said engine based on said adjusted load bias signal.

9. The method of claim 7 further including the step of supplying fuel to an internal combustion engine based on a fueling command;

and wherein the step of determining a load bias signal includes determining said load bias signal as a function of said fueling command.

10. The method of claim 7 wherein the step of determining an acceleration-adjusted load bias signal includes the steps of:

determining an optimal rate of change of engine RPM based on said engine rotational speed and said engine intake air pressure; and determining said acceleration-adjusted load bias signal based on said optimal rate-of-change of engine RPM and said load bias signal.

11. The method of claim 10 wherein the step of producing an adjusted load bias signal includes the step of producing said load adjusted load bias signal as one of said load bias signal and said acceleration-adjusted load bias signal based on a comparison therebetween.

12. A system for producing an adjusted load bias signal to provide for optimal acceleration conditions for an internal combustion engine, comprising:

means for sensing engine rotational speed and producing an engine speed signal corresponding thereto;

means for sensing intake air pressure of an internal combustion engine and producing a boost pressure signal corresponding thereto; and a control computer computing a load bias signal based on said engine speed signal, said control computer computing an acceleration-adjusted load bias signal based on said engine speed and boost pressure signals and producing an adjusted load bias signal as one of said load bias signal and said acceleration-adjusted load bias signal.

13. The system of claim 12 further including a load generator responsive to said adjusted load bias signal to control loading of said engine.

14. A system for producing an adjusted load bias signal to provide for optimal deceleration conditions for an internal combustion engine, comprising:

means for sensing engine rotational speed and producing an engine speed signal corresponding thereto;

means for determining a reference engine speed;

means for determining a load bias signal as a function of said engine speed signal; and means for producing an adjusted load bias signal as one of said load bias signal and a deceleration-adjusted load bias signal, said deceleration-adjusted load bias signal based on said engine speed signal and said reference engine speed.

15. The system of claim 14 further including means responsive to said adjusted load bias signal for controlling loading of said engine.

16. The system of claim 14 further including a fuel system responsive to a fueling command to supply fuel to said engine;

and wherein said means for determining said load bias value is further operable to determine said load bias value as a function of said fueling command.

17. The system of claim 14 further including means responsive to operator actuation for producing a requested torque signal, said reference engine speed based on said requested torque signal.

18. The system of claim 14 wherein said means for producing an adjusted load bias signal includes:

means for determining a speed difference as a difference between said engine speed signal and said reference engine speed; and means for producing said deceleration-adjusted load bias signal as a function of said speed difference and of said load bias signal.

19. The system of claim 18 wherein said means for producing an adjusted load bias signal includes means for producing said adjusted load bias signal as one of said load bias signal and said deceleration-adjusted load bias signal based on a comparison therebetween.

20. A method of producing an adjusted load bias signal to provide for optimal deceleration conditions for an internal combustion engine, the method comprising the steps of:

sensing engine rotational speed;

determining a reference engine speed;

determining a load bias signal as a function of said engine rotational speed;

determining a deceleration-adjusted load bias signal based on said engine rotational speed and said reference engine speed; and producing an adjusted load bias signal as one of said load bias signal and said deceleration-adjusted load bias signal.

21. The method of claim 20 further including the step of controlling loading of said engine based on said adjusted load bias signal.

22. The method of claim 20 further including the step of supplying fuel to an internal combustion engine based on a fueling command;

and wherein the step of determining a load bias signal includes determining said load bias signal as a function of said fueling command.

23. The method of claim 20 wherein the step of determining a deceleration-adjusted load bias signal includes the steps of:

determining a speed difference as a difference between said engine rotational speed and said reference engine speed; and determining said deceleration-adjusted load bias signal based on said speed difference and said load bias signal.

24. The method of claim 23 wherein the step of producing an adjusted load bias signal includes the step of producing said load adjusted load bias signal as one of said load bias signal and said deceleration-adjusted load bias signal based on a comparison therebetween.

25. A system for producing an adjusted load bias signal to provide for optimal deceleration conditions for an internal combustion engine, comprising:

means for sensing engine rotational speed and producing an engine speed signal corresponding thereto;

means for determining a reference engine speed based on an operator requested torque value; and a control computer computing a load bias signal based on said engine speed signal, said control computer computing a deceleration-adjusted load bias signal based on said engine speed and said reference engine speed and producing an adjusted load bias signal as one of said load bias signal and said deceleration-adjusted load bias signal.

26. The system of claim 25 further including a load generator responsive to said adjusted load bias signal to control loading of said engine.

27. A system for producing an adjusted load bias signal to provide for optimal acceleration and deceleration conditions for an internal combustion engine, comprising:

means for sensing engine rotational speed and producing an engine speed signal corresponding thereto;

means for sensing intake air pressure of an internal combustion engine and producing a boost pressure signal corresponding thereto;

means for determining a reference engine speed; and a control computer computing a load bias signal as a function of said engine speed signal, said control computer computing an acceleration-adjusted load bias value as a function of said engine speed and boost pressure signals and computing a deceleration-adjusted load bias value as a function of said engine speed signal and said reference engine speed, said control computer producing an adjusted load bias signal as one of said load bias signal, said acceleration-adjusted load bias value and said deceleration-adjusted load bias value.

28. The system of claim 27 further including a load generator controlling loading of said engine based on said adjusted load bias signal.

29. The system of claim 27 further including a fuel system responsive to a fueling command to supply fuel to said engine;

and wherein said control computer is further operable to compute said load bias value as a function of said fueling command.

30. The system of claim 27 wherein said control computer is operable to produce said adjusted load bias signal based on a comparison between said load bias signal, said acceleration-adjusted load bias value and said deceleration-adjusted load bias value.

31. The system of claim 30 wherein said control computer is operable to produce said adjusted load bias signal as said acceleration-adjusted load bias signal if said acceleration-adjusted load bias signal is significantly different than said load bias signal and said deceleration-adjusted load bias signal.

32. The system of claim 30 wherein said control computer is operable to produce said adjusted load bias signal as said deceleration-adjusted load bias signal if said deceleration-adjusted load bias signal is significantly different than said load bias signal and said acceleration-adjusted load bias signal.

33. The system of claim 30 wherein said control computer is operable to produce said adjusted load bias signal as said load bias signal if said acceleration-adjusted load bias signal, said deceleration-adjusted load bias signal and said load bias signal are not significantly different than each other.

34. The system of claim 30 wherein said control computer is further operable to determine said acceleration-adjusted load bias value as a function of said load bias signal.

35. The system of claim 30 wherein said control computer is further operable to determine said deceleration-adjusted load bias value as a function of said load bias signal.

36. A method of producing an adjusted load bias signal to provide for optimal acceleration and deceleration conditions for an internal combustion engine, the method comprising the steps of:

sensing engine rotational speed of an internal combustion engine;

sensing engine intake air pressure;

determining a reference engine speed based on operator requested torque;

determining a load bias signal as a function of said engine rotational speed;

determining an acceleration-adjusted load bias signal based on said engine rotational speed and said engine intake air pressure;

determining a deceleration-adjusted load bias signal based on said engine rotational speed and said reference engine speed; and producing an adjusted load bias signal as one of said load bias signal, said acceleration-adjusted load bias signal and said deceleration-adjusted load bias signal.

37. The method of claim 36 further including the step of controlling loading of said engine.

38. The method of claim 36 wherein the step of producing an adjusted load bias signal includes the step of producing said adjusted load bias signal based on a comparison between said load bias signal, said acceleration-adjusted load bias signal and said deceleration-adjusted load bias signal.

39. The method of claim 38 wherein the step of producing said adjusted load bias signal includes the step of producing said adjusted load bias signal as said acceleration-adjusted load bias signal if said acceleration-adjusted load bias signal is significantly different from said load bias signal and said deceleration-adjusted load bias signal.

40. The method of claim 38 wherein the step of producing said adjusted load bias signal includes the step of producing said adjusted load bias signal as said deceleration-adjusted load bias signal if said deceleration-adjusted load bias signal is significantly different from said load bias signal and said acceleration-adjusted load bias signal.

41. The method of claim 38 wherein the step of producing said adjusted load bias signal includes the step of producing said adjusted load bias signal as said load bias signal if said load bias signal, said acceleration-adjusted load bias signal and said deceleration-adjusted load bias signal are not significantly different from each other.

42. The method of claim 38 wherein the step of determining said acceleration-adjusted load bias value further includes determining said acceleration-adjusted load bias value as a function of said load bias value.

43. The method of claim 38 wherein the step of determining said deceleration-adjusted load bias value further includes determining said deceleration-adjusted load bias value as a function of said load bias value.

* * * * *

UNITED STATES PATENT AND TRADEMARK OFFICE
CERTIFICATE OF CORRECTION

PATENT NO. : 6,314,359 B1
DATED : November 6, 2001
INVENTOR(S) : Dusan M. Janic et al.

It is certified that error appears in the above-identified patent and that said Letters Patent is hereby corrected as shown below:

Title page,
ABSTRACT,
Line 9, please delete "... a reference engine speed and the load 10 bias signal to..." and insert -- ... a reference engine speed and the load bias signal to ... --

Column 6,
Line 10, please delete "... operable to produce the 25 deceleration-adjusted load bias ..." and insert -- ... operable to produce the deceleration-adjusted load bias ... --

Signed and Sealed this

Sixteenth Day of April, 2002

*Attest:*

JAMES E. ROGAN
*Director of the United States Patent and Trademark Office*

*Attesting Officer*